United States Patent
Swoboda

(10) Patent No.: US 6,820,051 B1
(45) Date of Patent: Nov. 16, 2004

(54) SOFTWARE EMULATION MONITOR EMPLOYED WITH HARDWARE SUSPEND MODE

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/483,570

(22) Filed: Jan. 14, 2000

Related U.S. Application Data

(60) Provisional application No. 60/120,683, filed on Feb. 19, 1999.

(51) Int. Cl.$^7$ .............................................. G06F 11/00
(52) U.S. Cl. .......................................... 703/28; 714/30
(58) Field of Search .............................. 703/28, 26, 27; 714/30, 31, 723, 39, 726, 729, 38; 702/117, 108, 118; 712/10

(56) References Cited

U.S. PATENT DOCUMENTS

| | | | | |
|---|---|---|---|---|
| 3,891,974 A | * | 6/1975 | Coulter et al. ............ 340/172.5 |
| 5,274,831 A | * | 12/1993 | Katsuta ....................... 395/800 |
| 5,511,217 A | * | 4/1996 | Nakajima et al. ............ 395/800 |
| 5,884,023 A | * | 3/1999 | Swoboda et al. ....... 395/183.06 |
| 5,960,191 A | * | 9/1999 | Sample et al. .......... 395/500.49 |
| 6,055,649 A | * | 4/2000 | Deao et al. .................... 714/30 |
| 6,075,941 A | * | 6/2000 | Itoh et al. .................... 395/704 |
| 6,085,336 A | * | 7/2000 | Swoboda et al. .............. 714/30 |
| 6,173,386 B1 | * | 1/2001 | Key et al. ....................... 712/10 |
| 6,289,300 B1 | * | 9/2001 | Brannick et al. .............. 703/28 |
| 6,370,606 B1 | * | 4/2002 | Bonola ........................ 710/260 |
| 6,385,742 B1 | * | 5/2002 | Kirsch et al. |
| 6,385,747 B1 | * | 5/2002 | Scott et al. .................. 714/724 |
| 6,446,221 B1 | * | 9/2002 | Jaggar et al. .................. 714/30 |
| 6,522,985 B1 | * | 2/2003 | Swoboda et al. ........... 702/117 |
| 6,564,339 B1 | * | 5/2003 | Swoboda et al. .............. 714/30 |
| 6,567,933 B1 | * | 5/2003 | Swoboda et al. .............. 714/31 |
| 6,681,341 B1 | * | 1/2004 | Fredenburg et al. .......... 714/30 |

* cited by examiner

*Primary Examiner*—Thai Phan
(74) *Attorney, Agent, or Firm*—Robert D. Marshall, Jr.; W. James Brady, III; Frederick J. Telecky, Jr.

(57) ABSTRACT

In-circuit-emulation of an integrated circuit including a digital data processor capable of executing program instructions. A debug event detector detects predetermined debug event. Upon detection of a debug event, the in-circuit-emulator suspends program execution except for real time interrupts. An emulation monitor program permitting visibility into the state of the integrated circuit is run as such a real time interrupt interrupt. The integrated circuit includes a serial scan path for control of the state of the integrated circuit, such as a JTAG interface. The in-circuit-emulation selectively assigning emulation resources of the integrated circuit to one of the serial scan path or the monitor program. A monitor privilege input controls this assignment by its digital state. The the emulation resource may be a read write data register and he assignment includes accessing the data register.

3 Claims, 2 Drawing Sheets

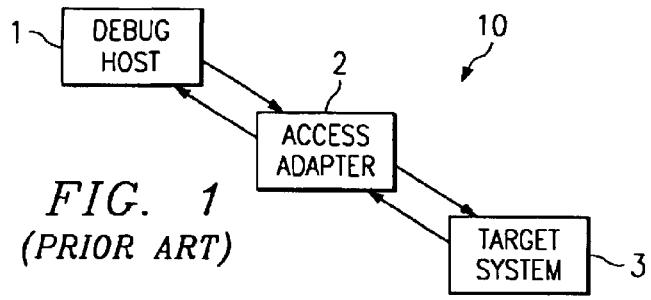
FIG. 1
(PRIOR ART)
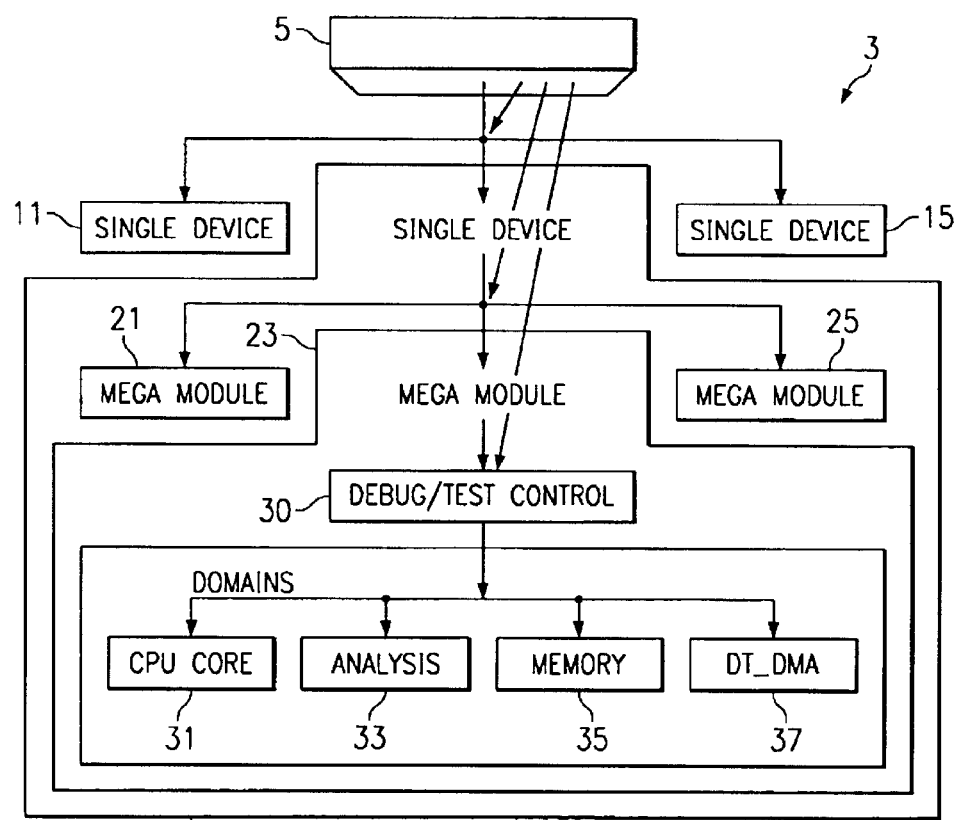

SOFTWARE EMULATION MONITOR EMPLOYED WITH HARDWARE SUSPEND MODE

This application claims priority under 35 USC §119(e)(1) of Provisional Application No. 60/120,683, filed Feb. 19, 1999.

This application is related to co-assigned applications all of which are incorporated herein by reference:

U.S. patent application Ser. No. 09/154,385 entitled "METHOD OF INITIALIZING A CPU CORE FOR EMULATION" filed Sep. 16, 1998, now U.S. Pat. No. 6,167,365 granted Dec. 26, 2002; and U.S. patent application Ser. No. 09/483,367, entitled "EMULATION SUSPEND MODE WITH DIFFERING RESPONSE TO DIFFERING CLASSES OF INTERRUPTS" claiming priority from U.S. Provisional Application No. 60/120,809 filed Feb. 19, 1999;

U.S. patent application Ser. No. 09/481,852, entitled "EMULATION SUSPENSION MODE WITH STOP MODE EXTENSION" claiming priority from U.S. Provisional Application No. 60/120,809 filed Feb. 19, 1999;

U.S. patent application Ser. No. 09/483,568, entitled "EMULATION SUSPEND MODE HANDLING MULTIPLE STOPS AND STARTS" claiming priority from U.S. Provisional Application No. 60/120,809 filed Feb. 19, 1999;

U.S. patent application Ser. No. 06/09/483,697, entitled "EMULATION SUSPEND MODE WITH FRAME CONTROLLED RESOURCE ACCESS" claiming priority from U.S. Provisional Application No. 60/120,809 filed Feb. 19, 1999;

U.S. patent application Ser. No. 09/482,902, entitled "EMULATION SUSPEND MODE WITH INSTRUCTION JAMMING" claiming priority from U.S. Provisional Application No. 60/120,809 filed Feb. 19, 1999;

U.S. patent application Ser. No. 09/483,237, entitled "EMULATION SYSTEM WITH SEARCH AND IDENTIFICATION OF OPTIONAL EMULATION PERIPHERALS" claiming priority from U.S. Provisional Application No. 60/120,960 filed Feb. 19, 1999;

U.S. patent application Ser. No. 09/483,783, entitled "EMULATION SYSTEM WITH ADDRESS COMPARISON UNIT AND DATA COMPARISON UNIT OWNERSHIP ARBITRATION" claiming priority from U.S. Provisional Application No. 60/120,791 filed Feb. 19, 1999;

U.S. patent application Ser. No. 09/481,853, entitled "EMULATION SYSTEM WITH PERIPHERALS RECORDING EMULATION FRAME WHEN STOP GENERATED" claiming priority from U.S. Provisional Application No. 60/120,810 filed Feb. 19, 1999; and U.S. patent application Ser. No. 09/483,321, entitled "EMULATION SYSTEM EMPLOYING SERIAL TEST PORT AND ALTERNATIVE DATA TRANSFER PROTOCOL" claiming priority from U.S. Provisional Application No. 60/120,667 filed Feb. 19, 1999

TECHNICAL FILED OF THE INVENTION

The technical field of this invention is complex integrated circuits including embedded digital processor cores and more particularly in circuit emulation of integrated circuits with embedded digital processor cores.

BACKGROUND OF THE INVENTION

Programmable digital processors such as microprocessors and digital signal processors have become very complex machines. Testing these programmable digital processors has also become complex task. It is now common for semiconductor manufactures to build single integrated circuit programmable digital processors with millions of transistors. The current trend is to devote many of these transistors to on-chip cache memories. Even so, the number of logic circuits and their complex relationships makes testing such integrated circuits an increasingly difficult task.

A trend in electronics makes this testing problem more difficult. Single integrated circuit programmable digital processors are becoming more and more of the electronics of many end products. A single integrated circuit used in this way typically includes a programmable digital processor, read only memory storing the base program, read/write memory for operation and a set of peripherals selected for the particular product. This trend is known as system level integration. In the ultimate system level integration, all the electronics are embodied in a single integrated circuit. This level of integration is now achieved in electronic calculators. Many electronic calculators consist of a single integrated circuit, a keyboard, a display, the battery or solar panel power source and a plastic case. Such integration provides less "visibility" into the operation of the programmable digital signal processor. Because the address and data busses of the digital processor are no longer brought out the device pins, it is more difficult to determine the behavior of the embedded processor from external connections.

Another trend in electronics makes this testing problem more difficult. Many new product applications require differing types of processing. Often control processes and user interface processes are better handled with a different programmable digital processor than digital signal processes. An example is wireless telephones. Many coding/decoding and filtering tasks are best handled by a digital signal processor (DSP). Other tasks such as dialing, controlling user inputs and outputs are best handled by microprocessors such as a RISC (Reduced Instruction Set Computer) processor. There is a trend for a system integrated circuit to include both a RISC processor and a DSP. These two processors will typically operate independently and employ differing instruction set architectures. Thus there may be more than one programmable digital processor on a single integrated circuit, each having limited visibility via the device pins.

Another problem is product emulation when employing these programmable digital processors. Product development and debugging is best handled with an emulation circuit closely corresponding to the actual integrated circuit to be employed in the final product. In circuit emulation (ICE) is in response to this need. An integrated circuit with ICE includes auxiliary circuit not needed in the operating product included solely to enhance emulation visibility. In the typical system level integration circuit, these emulation circuits use only a very small fraction of the number of transistors employed in operating circuits. Thus it is feasible to include ICE circuits in all integrated circuits manufactured. Since every integrated circuit can be used for emulation, inventory and manufacturing need not differ between a normal product and an emulation enhanced product.

As a result of these trends there is a need in the art for integrated circuits which are easier to test and easier to emulate.

SUMMARY OF THE INVENTION

This invention involves in-circuit-emulation of an integrated circuit. The integrated circuit includes a digital data processor capable of executing program instructions. A debug event detector detects predetermined debug event. Upon detection of a debug event, the in-circuit-emulator suspends program execution except for real time interrupts. An emulation monitor program permitting visibility into the state of the integrated circuit is run as such a real time interrupt interrupt.

The integrated circuit includes a serial scan path for control of the state of the integrated circuit, such as a JTAG interface. The in-circuit-emulation selectively assigning emulation resources of the integrated circuit to one of the serial scan path or the monitor program. A monitor privilege input controls this assignment by its digital state. The emulation resource may be a read write data register and the assignment includes accessing the data register.

These and other aspects of this invention are illustrated in the drawings, in which:

FIG. 1 illustrates the environment of the debugging system of this invention which is known in the art;

FIG. 2 illustrates the known 14-pin JTAG header used to interface the target system to the access adapter;

FIG. 3 illustrates an emulation level view of the target system;

DETAILED DESCRIPTION OF PREFERRED EMBODIMENTS

Figure 4:
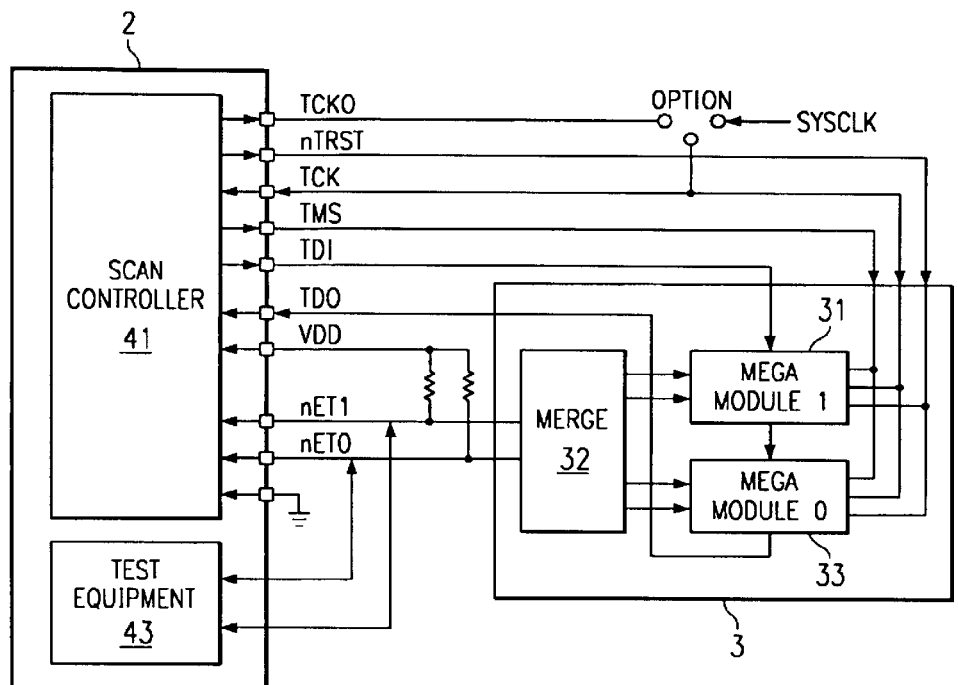
FIG. 4 illustrates an electrical connection view of the coupling between the access adapter and the target system.

FIG. 1 illustrates the environment of the debugging system of this invention. This environment connects high level debugging software executing on a debug host computer 1 to a low level debug interface supported by the target system 3. In this invention the target system 3 may include more than one programmable digital processor and possibly more than one such programmable digital processor on a single integrated circuit. In this application the term programmable digital processor is meant to encompass devices commonly known as microprocessors, microcontrollers and digital signal processors. The target system 3 provides a standard interface to the access adapter 2.

Debug host computer 1 consists of a computer, for example a PC, running a CPU core specific software debugger as one of its tasks. The debug host computer 1 allows the user to issue high level commands such as setting breakpoints, single stepping the programmable digital processor in target system 3 and displaying the contents of a memory range.

Access adapter 2 is a combination of hardware and software that connects the debug host computer 1 to target system 3. Access adapter 2 utilizes one or more hardware interfaces and/or protocols to convert messages created by user interface commands of debug host computer 1 into debug commands operable on target system 3. Access adapter 2 can be either loosely coupled or tightly coupled to the debug host computer 1. In the case of a PC host computer, access adapter 3 can be an XDS 510 scan controller attached directly to the PC bus. This implements a tightly coupled configuration requiring the PC to perform even the lowest level actions necessary to manage debug activity. In loosely coupled configurations, debug host computer 1 CPU communicates with another processor over a high bandwidth interface such as a SCSI, LAN or other interface. An example of this is a XDS 510WS controller connected to the target system debug interface and to the PC through a SCSI port. In this case access adapter 2 is a debug subsystem manager and handles the detailed manipulation of the target debug capability, and debug host computer 1 send high level commands to the debug subsystem. Access adapter 2 returns data and error conditions to debug host computer 1. Current PC operating systems may not be able to service the low level debug requirements continuously. Thus it may be advantageous to partition the problem into the display and user interface and control sections.

The target system 3 contains one or more programmable digital processor cores. The programmable digital processor core(s) contain hardware designed explicitly to ease debugging. This special hardware of target system 3 is the lowest element of the system debug environment 10. The programmable digital processor core debug facilities allow the user to control the program execution, examine or change system memory, core CPU resources in real-time.

The interface of access adapter 2 to target system 3 is preferably an extension to the IEEE 1149.1 (JTAG) test standard. The JTAG standard includes 5 primary signals known as nTRST, TCK, TMS, TDI, and TDO. The JTAG standard typically employs three additional signals Test Clock Out (TCKO), the target supply (Vdd) and ground (GND). The preferred embodiment of this invention also employs the two extension signals nET1 and nET0. Table 1 lists these signals, states whether the signal is an input, an output or both, and gives the descriptive name of the signal.

TABLE 1

| Pin | Type Input/Output | Description |
| --- | --- | --- |
| nTRST | I | Test Logic Reset Not |
| TCK | I | Test Clock |
| TMS | I | Test Mode Select |
| TDI | I | Test Data Input |
| TDO | O | Test Data Output |
| TCKO | O | Test Clock Out |
| PD(Vdd) | I | Target Power Supply |
| GND | I/O | Ground |
| nET1 | I/O | Emulation and Test 1 Not |
| nET0 | I/O | Emulation and Test 0 Not |

The signal nTRST is called Test Logic Reset Not. A low applied to this pin causes all test and debug logic in the target device to be reset along with the IEEE 1149.1 interface.

The signal TCK is called Test Clock. This signal is used to drive the IEEE 1149.1 state machine and logic. The same TCK supplied to the target device is supplied to this pin.

The signal TMS is called Test Mode Select. This signal directs the next state of the IEEE 1149.1 test access port state machine.

The signal TDI is called Test Data Input. This signal is the scan data input to the target device.

The signal TDO is called Test Data Output. This signal is the scan data output of the target device.

FIG. 2 illustrates a 14-pin JTAG header used to interface target system 3 to access adapter 2. The JTAG header requires three additional pins. and further includes two extension pins. The signal TCKO is called Test Clock Out. This signal is a test clock supplied by the scan controller to the target system. This test clock can be used as the system TCK source, or it can be ignored with the TCK source being generated by the target system. In many target systems, TCKO is simply connected to TCK and used as the test clock. The PD(Vdd) is called the Target Power Supply. This is used as a power detect input to access adapter 2. The JTAG header also includes ground connections.

The preferred embodiment of this invention includes an extension to the JTAG interface. Two pins nET0 and nET1 serve as a two pin trigger channel function. This function supplements the serial access capability of the standard interface with continuous monitoring of device activity. The two added pins create debug and test capabilities that cannot be created with the standard interface. The nET0 signal is called Emulation and Test 0 Not. This signal helps create a trigger to channel zero. Similarly, the nET1 signal is called Emulation and Test 1 Not. This signal helps create a trigger to channel one. These channels will be further explained below.

FIG. 3 illustrates an emulation level view of target system 3. Target system 3 may include plural devices 11, 13 and 15. FIG. 3 illustrates details of example device 13 which includes plural megamodules 21, 23 and 25. FIG. 3 illustrates details of example megamodules 23. Example megamodule 23 includes debug and test control unit 30 and plural device domains. These device domains include central processing unit (CPU) core 31, analysis unit 33, memory 35 and debug/test direct memory access (DT_DMA) unit 37.

Debug and test control unit 30 contains the IEEE interface. It provides a bridge between the Extended IEEE Interface and the debug and test capability distributed through the domains. Debug and test control unit 30 can independently control by the domains 31, 33, 35 and 37. In other words, one or more domains can be scanned or controlled while other domains continue operate in their normal functional way.

FIG. 4 illustrates an electrical connection view of the coupling between access adapter 2 and target system 3. FIG. 4 shows the connections of the of the various signals of the JTAG header 5 illustrated in FIG. 2. All these signals are connected to scan controller 41. The signals nTRST, TCK and TMS are connected to two example megamodules 31 and 33. FIG. 4 illustrates the optional connection of TCKO to the target system clock SYSCLK. The scan input TDI connects to a scan input of megamodule 31. The scan output of megamodule 31 supplies the scan input of eg module 33. The scan output of megamodule 33 supplies the scan output TDO. The two extension signals nET0 and nET1 control meg modules 31 and 33 via merge unit 32. These extension signals are monitored by test equipment 43.

The debugging environment illustrated in FIGS. 1 to 4 permit the user to control application execution by any programmable digital processor of target system 3. Typical control processes include: keyboard directives such as run, halt and step; software breakpoints using op-code replacement; internal analysis breakpoints specified by the program counter or watchpoints specified by data accesses; and externally generated debug events.

Actions such as decoding a software breakpoint instruction (DSTOP), the occurrence of an analysis breakpoint or watchpoint (ASTOP), or the occurrence of a debug host computer event (HSTOP) are referred to as debug events. Debug events cause execution to suspend. Debug events tied to the execution of specific instructions are called breakpoints. Debug events generated by memory references are called watchpoints. External debug events can also suspend execution. Debug events cause entry into the Debug State.

Figure 5:
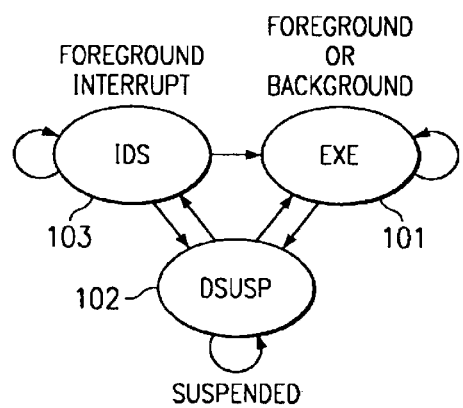
FIG. 5 illustrates the possible operation states in the debugging environment of the preferred embodiment of this invention.

FIG. 5 illustrates the possible operation states in the debugging environment of the preferred embodiment of this invention. These operation states are execute (EXE) 101, debug suspend (DSUSP) 102 and interrupt during debug suspend (IDS) 103.

Execute state 101 corresponds to the ordinary operation of target device 3. In the execute state 101 instructions are executed by the programmable digital processor in normal fashion. There are no outstanding debug suspend conditions. A low logic level applied to the nTRST terminal or a software directive requesting functional run forces the operational state to execute state 101. In execute state 101 the pipeline fetches and executes instructions and process interrupts in a normal way.

The operational state transits from execute state 101 to debug suspend state 102 upon a debug event. The debugging environment of the preferred embodiment of this invention allows the suspension of program execution at points defined by breakpoints, watchpoints, and debug software directives, provided the application is an allowable debug suspend window. In general, debug events are allowed at an instruction boundary, when reset is inactive and no interrupts are active. Program execution suspends at an instruction boundary and the operational state changes to debug suspend state 102. When any debug condition is not met, the operational state remains in execute state 101 and no debug event processing in the delayed slots of delayed branch instructions. Debug events occurring outside the debug suspend window create a debug pending condition. This condition suspends program execution when the application enables debug interrupts by opening the debug suspend window.

In the debug suspend state 102 background instruction execution is inactive. This state permits debug/emulation visibility into the state of target device 3 while background execution is suspended. In debug suspend state 102, the program counter (PC) and status bits are generally preserved at their values prior to the debug event. The PC points to the instruction to be executed next. When execution resumes, the instruction referenced by the PC and those following is fetched for execution. This is facilitated by flushing the front end of the pipeline upon entry into debug suspend state 102 from execute state 101.

The operational state may return to execute state 101 by a debug run directive. This may be either an unconditional run directive or a single step run directive. A single step run directive enters execute state 101 long enough to advance the instruction pipeline one stage and then returns to debug suspend state 102.

It is important to note that debug suspend state 102 consumes no CPU bandwidth because no monitor code executes as a result of suspending execution. The debug architecture provides for complete register and memory accessibility without the aid of a monitor program. The user may change the operating mode at any time without restrictions.

Certain interrupts transition the operation state from debug suspend state 102 to interrupt during suspend (IDS) state 103. These interrupts are defined by a separate interrupt mask independent of the normal interrupt mask. Those interrupts defined as high priority interrupts (HPI) or foreground interrupts cause the operation state to enter the interrupt during suspend state 103 from the debug suspend state 102. The debug suspend state 102 enables high priority interrupts independent of the state of the global interrupt enable bit or of software run directives. This enables debugging of background tasks while the target device 3 continues to service a real time application via high priority interrupts.

The interrupt pipeline jam for such a high priority interrupt moves the operational state to interrupt during suspend state 103. This jam causes an extra word to be pushed on the stack containing the debug status describing the reason the debug suspend state 102 entry occurred. Interrupt during suspend state 103 differs from the execute state 101 in that the interrupt processing creates a thread, linking the interrupt execution to the debug suspend state 102 as described in above. A digital frame counter (DFC) is incremented upon each high priority interrupt taken. The high priority interrupt sets an interrupt during debug state bit (IDS), which is part of the CPU status. The IDS bit sets after the context save stores the previous value on the stack with the status word. When returning from an interrupt the IDS bit indicates whether to re-enter debug suspend state 102. If the IDS bit is set, the interrupt occurred during a debug suspend state 102 and the operational state should return to the debug suspend state 102. If the IDS bit is not set, the interrupt occurred during the execute state 101 and the operational state should return to execute state 101. Upon returning from the interrupt, the PC and status return to their state before the interrupt unless the interrupt service routine has purposely modified values on the stack. This is required because it is possible for multiple interrupts to occur and be serviced while the device is in debug suspend state 102.

The digital frame counter is decremented upon each return from interrupt. This count permits the debug environment to track the status of the suspended foreground task. For example, a taken high priority interrupt may change the machine state and thus the current machine state would not reflect the suspended background task. However, if the digital frame counter were zero, then the debug environment is assured no interrupts have temporarily changed the machine state.

The interrupt during suspend state 103 is exited at the end of the interrupt service routine. A normal end of an interrupt involves a return from interrupt instruction (RTI). Upon execution of a return from interrupt instruction, the machine status is popped from the stack. As noted above, the interrupt during debug state bit indicates whether the interrupt occurred during execute state 101 or debug suspend state 102. The operational state return to the former state as indicated by the interrupt during debug state bit. The prior value of the program counter is reloaded to recover the prior machine status. Execution of a return from interrupt instruction also decrements the digital frame counter. Because it is possible to receive a higher priority interrupt while servicing a prior interrupt, more than one interrupt level may be pending. The digital frame counter indicates the current interrupt level. This is useful to debug processing as the machine status may be changed by the multiple interrupts. The debug software can read the digital frame counter and supply a debug level identity to identify currently targeted interrupt level. Execution and register operations target a specific debug level. Memory operations can target a specific debug level or bypass the level comparison. In particular, the status of the background task suspended on initial entry into debug suspend state 102 can only be reliably determined if the digital frame counter is zero. The maximum number of levels of the digital frame counter corresponds to the size of the interrupt hierarchy. This data preserves a path back to the debug suspend state 102 when the application concludes the interrupt service routine with a return from interrupt instruction.

The interrupt during suspend state 103 transits to the execute state 102 upon execution of an abort interrupt (ABORTI) instruction. The abort interrupt instruction would ordinarily be used only on detection of a unrecoverable error in the interrupt service routine. The path back to the debug suspend state is broken upon execution of the abort interrupt instruction. The status of the interrupt during debug state bit and the digital frame counter are ignored in this case. In particular, the interrupt during debug state bit is cleared and the digital frame counter is set to zero. This mechanism enables recovery to the background task when a high priority interrupt service routine has an unrecoverable error.

Interrupts can be serviced the while the debug software views or modifies the CPU state. The debug state shown to the programmer reflects the machine state when there is no interrupt service routine active. The debug software works with on-chip debug support to ensure the high priority interrupts are transparent to a debug session. Likewise this hardware and software combination works to make debug activity transparent to high priority interrupt service routines. Note that program execution can actually be suspended in multiple locations if it is desired to break within a time critical interrupt while still allowing others to be serviced.

Table 2 lists all the debug related registers included in each megamodule. Miscellaneous control bits supporting the JTAG interface are not included in this list. Most but not all of the debug unit registers are placed in the memory map so they are accessible by both debug software and the application. There are three levels of register access: registers always shared by the application and debug facilities; registers accessed through the extended JTAG port only; and registers accessed through the extended JTAG port or a specially privileged monitor program but not shared.

The application and debug software share registers controlling external trigger event inputs, breakpoints and watchpoints, data logging, parallel signature analysis, and count functions. The application and debug software can not simultaneously own these resources but establish ownership and release ownership through memory mapped control registers continuously visible to both the application and debug software. The debug software has the ability to seize any resource if necessary, or negotiate with the application through software sequences.

Other registers are specific to JTAG scan support and can never be accessed by the application. This class of registers is clocked with TCK and includes the JXREG, GPSR. EXSR, and IR_LTCH registers. Another register, the MF_REGS_1 register is clocked with FCK but is not accessible to the application. This register controls the device operational state as illustrated in FIG. 5, special reset modes, test modes, clock source selection and the like.

A third class of registers is accessible through JTAG and accessible to the application if a special privileges are granted to a monitor function via a megamodule terminal MON_PRIV. When this terminal is grounded the application cannot access this register class. When this terminal is a logic 1, the application code can access a debug control register normally controlled by JTAG scans. This register contains nET0 and nET1 pin control, execution control and the debug frame reference register.

During normal operation, when MON_PRIV is a 1, the application owns the $MF_{13}REGS_{13}0$ resources. They cannot be accessed via JTAG scan as this amounts to dual allocation of resources. The monitor program must manage execution control and other debug resources. The monitor program can communicate with the debug software through a serial port or other mechanism that is not the JTAG interface. This allows the extended JTAG port to be operated in the Hidden IEEE 1149.1 format. This allows the application to assign system functions to all or some or all of the extended JTAG port pins, with the extended JTAG port available for production test. The drawbacks of this approach are simply diminished capability on a number of fronts.

This approach requires a monitor program and additional memory resources. The data logging capabilities through the JTAG interface are lost. This approach brings along with it the traditional class of problems associated with asynchronous communication that may be laced with resets and other system upsets. In spite of these disadvantages, the advantages of using a system communication mechanism with a smaller number of debug related pins can out weigh the disadvantages in some systems.

TABLE 2

| Width | Memory Mapped | Register Name | Description |
|---|---|---|---|
| 8 | No | IR_LTCH | Latched Instruction Register |
| 6 | No | EXSR | Extended Shift Register |
| 32 | No | JXREG | JTAG Transfer Register |
| 32 | No | GPSR | General Purpose Shift Reg. |
| 32 | No** | FXREG | Functional Transfer Register |
| 32 | No | MF_REGS_1 | Misc. Function Register 1 |
| 32 | Yes | MF_REGS_0 | Misc. Function Register 0 |
| 16 | Yes | DBG_STATUS | Debug status |
| 16 | Yes | ECNTL | External Event Control |
| 16 | Yes | ACNTL | Address Unit Control |
| 32 | Yes | AMSK | Adrs. Mask Register |
| 32 | Yes | AREF | Adrs. Reference Register |
| 16 | Yes | DCNTL | Data Unit Control |
| 32 | Yes | DMSK | Data Mask Register |
| 32 | Yes | DREF | Data Reference Register |
| 16 | Yes | HPIR | High Priority Interrupt Reg. |

**Monitor privileged writes to MF_REG_0 use the FXREG as a temporary register.

Table 3 shows the memory map register order for the sixteen debug registers placed in the memory map. Debug registers are accessed as 32 bit values for debug while the application may access them as 32 bit register pairs or sixteen bit registers when the underlying CPU architecture supports only 16 bit data. Registers fourteen and fifteen are accessible in the memory map when the MON_PRIV megamodule terminal is TRUE. These two registers are write only. A bit in an scan accessible register also enables this mode.

TABLE 3

| Reg.* | Register Name | Read | Write | Description |
|---|---|---|---|---|
| 19 | CMSGH | No | Yes | Cmd. Msg. Reg. High |
| 18 | CMSGL | No | Yes | Cmd. Msg Reg. Low |
| 17 | DMSGH | No | Yes | Data Msg. Reg. High |
| 16 | DMSGL | No | Yes | Data Msg Reg. Low |
| 15 | MF_REGS_OH | No | Mon. | Misc. Func. Reg. 0 High |
| 14 | MF_REGS_OL | No | Mon. | Misc. Func. Reg. 0 Low |
| 13 | Reserved | — | — | Reserved |
| 12 | DBG_STAT | Yes | Yes | Debug Status |

TABLE 3-continued

| Reg.* | Register Name | Read | Write | Description |
|---|---|---|---|---|
| 11 | ECNTL | Yes | Yes | External Unit Control |
| 10 | DCNTL | Yes | Yes | Data Unit Control |
| 09 | DREFH | Yes | Yes | Data Ref. Reg. High |
| 08 | DREFL | Yes | Yes | Data Ref. Reg. Low |
| 07 | DMSKH | Yes | Yes | Data Mask Reg. High |
| 06 | DMSKL | Yes | Yes | Data Mask Reg. Low |
| 05 | AREFH | Yes | Yes | Adrs. Ret. Reg. High |
| 04 | AREFL | Yes | Yes | Adrs. Ref. Reg. Low |
| 03 | AMSKH | Yes | Yes | Adrs. Mask Reg. High |
| 02 | AMSKL | Yes | Yes | Adrs. Mask Reg. Low |
| 01 | ACNTL | Yes | Yes | Address Unit Control |
| 00 | HPIR | Yes | Yes | High Priority Int. Reg. |

The EXSR, GPSR and JXREG registers are clocked with the test clock (TCK) and are only accessible via the extended JTAG port. The EXSR and GPSR provide the instruction and data register scan paths. The JXREG provides an a holding register for the GPSR contents. Data is copied from the GPSR to the JXREG any time the GPSR data needs to be transferred to another register. Since these registers are basic components of the scan path and are not tightly coupled to functional logic, they are inaccessible to the application. Update JTAG states and fast downloads actions cause these transfers. When operating in imbedded command mode, the GPSR is also moved to the JXREG for disposition.

What is claimed is:

1. A method of in circuit emulation of an integrated circuit including a digital data processor capable of executing program instructions, the integrated circuit including a serial scan path for control of the state of the integrated circuit, comprising the steps of:
   detecting a predetermined debug event;
   upon detection of said predetermined debug event suspending program execution except for at least one type interrupt;
   executing an emulation monitor program via said at least one type interrupt; and
   selectively assigning control of at least one emulation resource of the integrated circuit to one of said serial scan path or said monitor program.

2. The method of claim 1, wherein the integrated circuit includes a monitor privilege input, said method wherein:
   said step of selectively assigning emulation resources of the integrated circuit assigns said emulation resources to said serial scan path upon a first digital state of said monitor privilege input and assigns said emulation resources to said emulation monitor program upon a second digital state of said monitor privilege input.

3. The method of claim 1, the emulation resources include at least one read write data register, said method further comprising:
   said step of selectively assigning emulation resources of the integrated circuit includes accessing said at least one read write data register.

* * * * *